US012654476B2

(12) United States Patent
Kubokawa et al.

(10) Patent No.: US 12,654,476 B2
(45) Date of Patent: Jun. 16, 2026

(54) PRINTING APPARATUS AND CONTROL METHOD OF THE SAME, AND STORAGE MEDIUM

(71) Applicant: CANON KABUSHIKI KAISHA, Tokyo (JP)

(72) Inventors: Junichi Kubokawa, Nagasaki (JP); Masaaki Matsuura, Kanagawa (JP); Haruo Uchida, Kanagawa (JP); Shoichi Kan, Kanagawa (JP); Takaaki Ishida, Kanagawa (JP); Keisei Hakamata, Kanagawa (JP); Noriyuki Sugiyama, Kanagawa (JP); Motoyuki Taguchi, Tokyo (JP); Takahiro Kiuchi, Tokyo (JP); Yasunori Matsumoto, Kanagawa (JP); Yumi Mukoyama, Tokyo (JP); Kyosuke Kamishima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 285 days.

(21) Appl. No.: 18/138,983

(22) Filed: Apr. 25, 2023

(65) Prior Publication Data

US 2023/0339244 A1 Oct. 26, 2023

(30) Foreign Application Priority Data

Apr. 26, 2022 (JP) ................................ 2022-072669

(51) Int. Cl.
*B41J 13/00* (2006.01)
*B65H 15/00* (2006.01)
(Continued)

(52) U.S. Cl.
CPC ........ *B41J 13/0045* (2013.01); *B65H 15/004* (2020.08); *B65H 29/60* (2013.01);
(Continued)

(58) Field of Classification Search
CPC .................. B65H 85/00; B65H 15/004; B65H 2301/33312; B65H 7/02
See application file for complete search history.

(56) References Cited

U.S. PATENT DOCUMENTS

| | | | | |
|---|---|---|---|---|
| 7,703,763 | B2 * | 4/2010 | Shiohara ............ | G03G 15/6502 271/118 |
| 8,577,234 | B2 * | 11/2013 | Kato ...................... | G03G 21/20 399/44 |

(Continued)

FOREIGN PATENT DOCUMENTS

| | | |
|---|---|---|
| JP | 2010-102173 A | 5/2010 |
| JP | 2020-015180 A | 1/2020 |
| JP | 2020-100500 A | 7/2020 |

OTHER PUBLICATIONS

U.S. Appl. No. 18/122,336, Masashi Ito, Keisuke Arita, Kento Tamari, Motoyuki Taguchi, Sho Takahashi, Ryota Komatsu, filed Mar. 16, 2023.

(Continued)

*Primary Examiner* — Patrick Cicchino
(74) *Attorney, Agent, or Firm* — Venable LLP

(57) ABSTRACT

A printing apparatus includes a first conveyance path, a conveyance roller, a printing unit, a reverse roller provided at a position on a downstream side of the printing unit in a first direction, a second conveyance path configured to reverse the front and back of the print medium, and a control unit. In a case where a first print medium on which printing has been performed first is conveyed in a second direction via the second conveyance path, the control unit controls the conveyance roller and the reverse roller, such that a trailing edge of the first print medium in the second direction passes through the reverse roller before a second print medium
(Continued)

conveyed by the conveyance roller subsequent to the first print medium reaches the reverse roller.

11 Claims, 10 Drawing Sheets

(51) Int. Cl.
*B65H 29/60* (2006.01)
*B65H 85/00* (2006.01)

(52) U.S. Cl.
CPC ... *B65H 85/00* (2013.01); *B65H 2301/33312* (2013.01); *B65H 2404/632* (2013.01); *B65H 2513/41* (2013.01); *B65H 2701/1311* (2013.01); *B65H 2701/1313* (2013.01); *B65H 2801/06* (2013.01)

(56) References Cited

U.S. PATENT DOCUMENTS

| | | | | |
|---|---|---|---|---|
| 10,018,953 | B2 * | 7/2018 | Tajiri | G03G 21/14 |
| 10,082,757 | B1 * | 9/2018 | Cook | B65H 29/125 |
| 10,642,211 | B2 * | 5/2020 | Deno | B65H 29/60 |
| 11,167,945 | B2 | 11/2021 | Matsuura et al. | |
| 11,299,360 | B2 * | 4/2022 | Katto | B65H 9/006 |
| 11,726,424 | B2 * | 8/2023 | Suzuki | B65H 5/062 271/301 |
| 2011/0085838 | A1 * | 4/2011 | Won | G03G 15/6552 399/397 |
| 2023/0294426 | A1 * | 9/2023 | Sugiyama | B41J 13/009 347/16 |

OTHER PUBLICATIONS

U.S. Appl. No. 18/122,348, Noriyuki Sugiyama, Motoyuki Taguchi, Junichi Kubokawa, Yasunori Matsumoto, Yumi Mukoyama, Takahiro Kiuchi, Keisei Hakamata, Haruo Uchida, Shoichi Kan, Takaai Ishida, Kyosuke Kamishima, filed Mar. 16, 2023.
Office Action dated Mar. 9, 2026, in Japanese Patent Application No. 2022-072669.

* cited by examiner

PRINTING APPARATUS AND CONTROL METHOD OF THE SAME, AND STORAGE MEDIUM

BACKGROUND OF THE INVENTION

Field of the Invention

The present invention relates to a printing apparatus that can perform double-sided printing by automatically reversing a print medium from a first side to a second side.

Description of the Related Art

In a printing apparatus printable on both sides of a print medium, a technique for improving productivity of double-sided printing is proposed.

Japanese Patent Laid-Open No. 2020-15180 discloses a technique in which, in a printing apparatus that can perform the double-sided printing on a front side and a back side of the print medium, productivity of the double-sided printing is enhanced by feeding a subsequent print medium to perform front side printing before back side printing on the print medium in which the front side printing is completed.

In the technique described in Japanese Patent Laid-Open No. 2020-15180, during the double-sided printing, a preceding print medium on which the front side printing is performed is switched back by reverse rollers to be pulled in to a reverse conveyance path, and the front side printing is performed on the subsequent print medium. However, when the preceding print medium is nipped by the reverse rollers, the subsequent print medium is conveyed from a printing unit toward the reverse rollers, but cannot enter the reverse roller because a conveyance direction is different from a conveyance direction of the preceding print medium. Thus, it is configured such that after the preceding print medium reaches an intermediate roller in a reverse conveyance path and the nip by the reverse rollers is released, the subsequent print medium enters the reverse roller.

In Japanese Patent Laid-Open No. 2020-15180, the reverse rollers can be separated, and thus the preceding print medium and the subsequent print medium can be overlapped with each other downstream of the reverse rollers. However, in order to separate the reverse rollers, a separating mechanism is required, and the mechanism becomes complicated.

SUMMARY OF THE INVENTION

The present invention has been made in view of the above-described problems, and the time required for the printing process when performing the double-sided printing is shortened with a simple configuration.

According to a first aspect of the present invention, there is provided a printing apparatus comprising: a first conveyance path configured to convey a print medium in a first direction; a conveyance roller provided in the first conveyance path and configured to convey the print medium in the first direction; a printing unit configured to print an image on the print medium conveyed by the conveyance roller; a reverse roller provided at a position on a downstream side of the printing unit in the first direction of the first conveyance path and configured to be able to reverse a conveyance direction of the print medium and convey the print medium in a second direction different from the first direction; a second conveyance path configured to reverse the front and back of the print medium conveyed in the second direction by the reverse roller and convey the print medium to the first conveyance path; and a control unit configured to control rotation of the conveyance roller and the reverse roller, wherein in a case where a first print medium on which printing has been performed first is conveyed in the second direction via the second conveyance path, the control unit controls the conveyance roller and the reverse roller, such that a trailing edge of the first print medium in the second direction passes through the reverse roller before a second print medium conveyed by the conveyance roller subsequent to the first print medium reaches the reverse roller.

According to a second aspect of the present invention, there is provided a method of controlling a printing apparatus including a first conveyance path configured to convey a print medium in a first direction, a conveyance roller provided in the first conveyance path and configured to convey the print medium in the first direction, a printing unit configured to print an image on the print medium conveyed by the conveyance roller, a reverse roller provided at a position on a downstream side of the printing unit in the first direction of the first conveyance path and configured to be able to reverse a conveyance direction of the print medium and convey the print medium in a second direction different from the first direction, and a second conveyance path configured to reverse the front and back of the print medium conveyed in the second direction by the reverse roller and convey the print medium to the first conveyance path, the method comprising: controlling rotation of the conveyance roller and the reverse roller, wherein in a case where a print medium on which printing has been performed first is conveyed in the second direction via the second conveyance path, the controlling controls the conveyance roller and the reverse roller, such that a trailing edge of the first print medium in the second direction passes through the reverse roller before a second print medium conveyed by the conveyance roller subsequent to the first print medium reaches the reverse roller.

Further features of the present invention will become apparent from the following description of exemplary embodiments with reference to the attached drawings.

DESCRIPTION OF THE EMBODIMENTS

Figure 1:
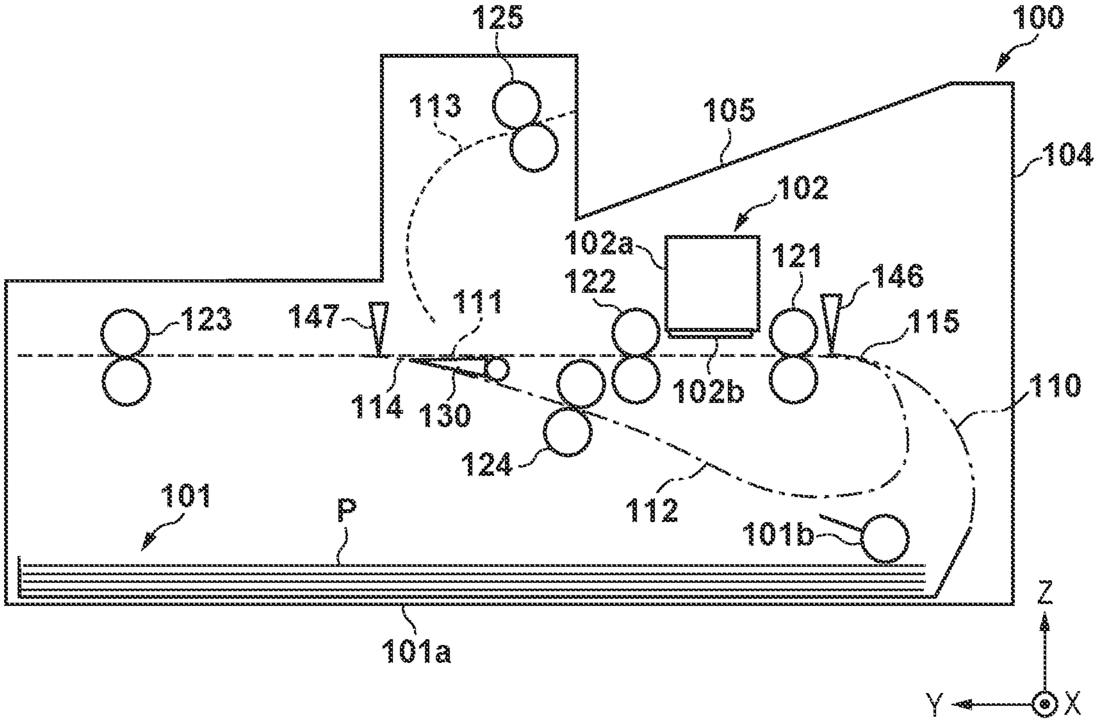
FIG. 1 is a schematic side sectional view illustrating a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

A printing apparatus 100 according to an embodiment of the present invention will be described below with reference to the accompanying drawings. Assuming that the printing apparatus 100 is placed on a horizontal plane, a vertical direction is defined as a Z direction, a printing direction and a conveyance direction of a print medium P in a printing unit 102 are defined as a Y direction, and a width direction orthogonal to a YZ plane is defined as an X direction.

Overall Configuration

FIG. 1 is a schematic sectional view of the printing apparatus 100 viewed from the YZ plane. The printing apparatus 100 is an inkjet printing apparatus 100 that ejects ink onto the print medium P to print an image, but the present invention is also [[be applicable to the printing apparatus 100 having other forms.

Figure 4:
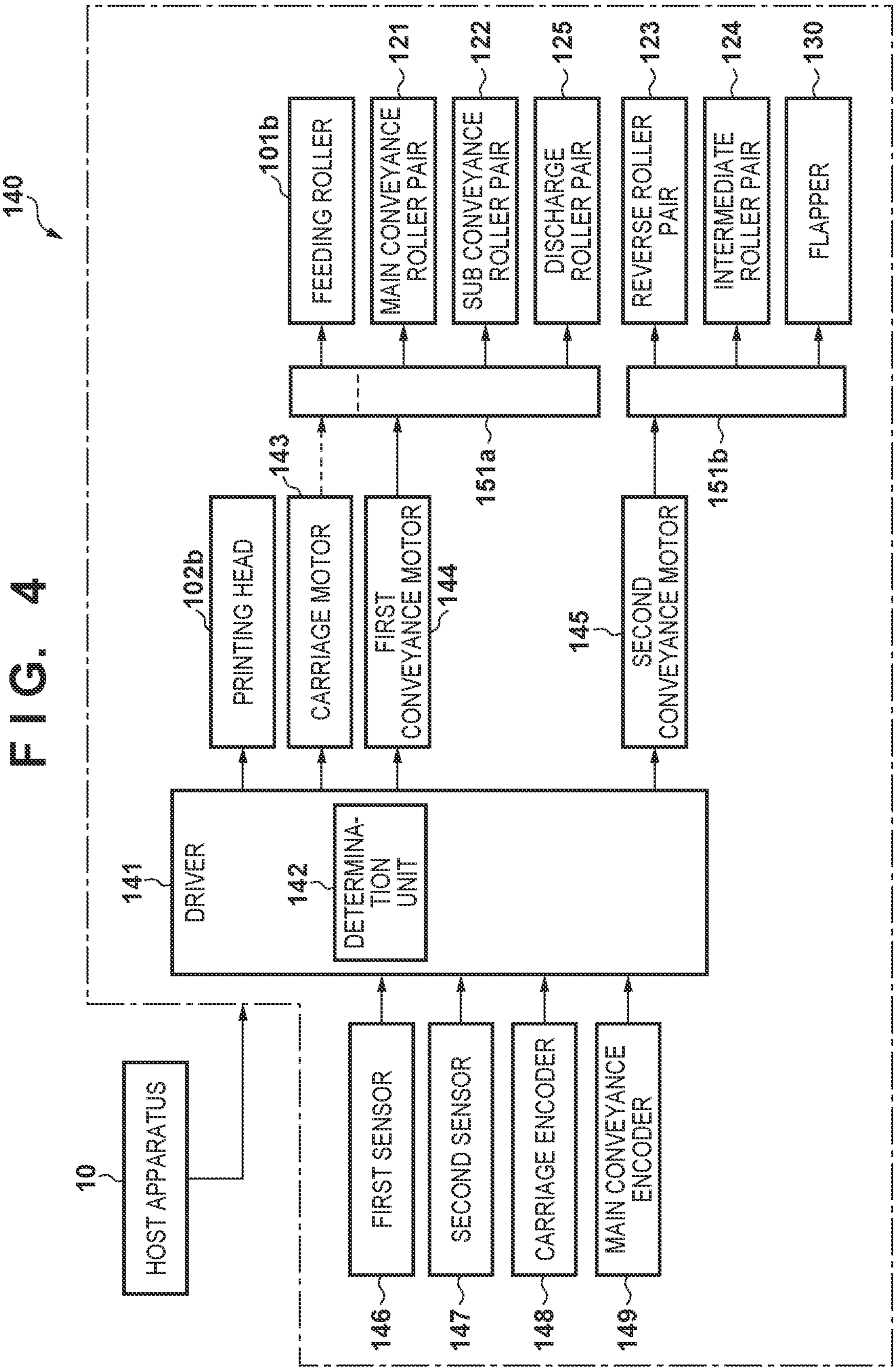
FIG. 4 is a block diagram of a control unit that controls the printing apparatus.

As illustrated in FIG. 1, a sheet stacking unit 101 includes a feeding roller 101*b* and a feeding cassette 101*a*, and the feeding roller 101*b* can convey the stacked print medium P to a supply path 110 by applying a conveying force to the stacked print medium P by a driving force of a first conveyance motor 144 (see FIG. 4). The feeding cassette 101*a* is detachably attached to a housing 104 that forms a casing of the printing apparatus 100, and can hold the print media P in a stacked state.

The supply path 110 is connected to a first conveyance path 111 on a downstream side in the conveyance direction of the print medium P. The print medium P conveyed by the feeding roller 101*b* passes through the supply path 110 and passes through a first sensor 146 provided on an upstream side of a main conveyance roller pair 121 of the first conveyance path 111, which will be described later. A roller pair configured to assist conveyance may be provided in the supply path 110.

The first sensor 146 is a sheet detection unit using, for example, a photo interrupter and a shield lever. The first sensor 146 detects passage of a leading edge (leading edge portion) of the print medium P to determine jam or specify a sheet position. The print medium P passed through the first sensor 146 is nipped by the main conveyance roller pair 121 and conveyed to the printing unit 102. The printing unit 102 is provided between the main conveyance roller pair 121 and a sub conveyance roller pair 122, and includes a carriage 102*a* and a printing head 102*b*. The carriage 102*a* is configured such that the carriage 102*a* can reciprocate in the X direction by a driving force of a carriage motor 143 (see FIG. 4), and position control and speed control are performed using a carriage encoder 148 (see FIG. 4).

The printing head 102*b* is mounted on the carriage 102*a*, and includes an ink ejection portion formed by a plurality of nozzles. By working with operations of the carriage 102*a*, the main conveyance roller pair 121, and the sub conveyance roller pair 122, printing can be performed on the entire region of the print medium P.

The main conveyance roller pair 121 and the sub conveyance roller pair 122 are synchronously driven by the first conveyance motor 144 (see FIG. 4), and drive control of the main conveyance roller pair 121 and the sub conveyance roller pair 122 are performed based on position information and speed information obtained by a main conveyance encoder 149 (see FIG. 4). The first conveyance path 111 is configured to be connectable to the sheet discharge path 113 at a downstream position of the sub conveyance roller pair 122 in the conveyance direction via a flapper 130 that can change a position, which will be described later, and the print medium P on which printing is completed is guided to the sheet discharge path 113 by the flapper 130. The sheet discharge path 113 includes a sheet discharge roller pair 125, and the print medium P passing through the sheet discharge path 113 is discharged onto a sheet discharge tray 105 by the sheet discharge roller pair 125. In the embodiment in FIG. 1, the print medium P is configured to be discharged face-down, but the print medium P may be configured to be discharged face-up.

A reverse roller pair 123 is disposed on the downstream side of the first conveyance path 111 and is driven by a second conveyance motor 145 (see FIG. 4) which is a driving source different from the first conveyance motor 144 (see FIG. 4). The reverse roller pair 123 nips the print medium P in which printing is completed on one side when a double-sided printing command is issued, pulls in the print medium P, and then reverses the rotation direction, and thus the print medium P can be conveyed to a second conveyance path 112 different from the first conveyance path 111. The second conveyance path 112 is connected to the first conveyance path 111 between the sub conveyance roller pair 122 and the reverse roller pair 123, and the flapper 130 described above is disposed at a junction (first junction 114).

The flapper 130 is configured to be movable between a first position 130*a* (see FIG. 3A) at which the print medium P can be conveyed in a direction from the printing unit 102 toward the reverse roller pair 123 and a second position 130*b* (see FIG. 3B) different from the first position 130*a*. The flapper 130 moves to a predetermined position between the first position 130*a* and the second position 130*b*, and thus the print medium P can be guided from the reverse roller pair 123 to the second conveyance path 112. As a moving unit of the flapper 130, for example, a configuration such that a rotation shaft of the flapper 130 receives a rotational force by reversing the reverse roller pair 123 is conceivable, but an actuator may be separately provided. The predetermined position of the flapper 130 is desirably the same position as the second position at which the print medium P is guided to the sheet discharge path 113, but a unique position may be provided to each of the predetermined position and the second position.

A second sensor 147 having the same configuration as the configuration of the first sensor 146 is provided between the sub conveyance roller pair 122 and the reverse roller pair 123. The second sensor 147 reads a passage of a trailing edge of the print medium P conveyed in a direction from the printing unit 102 toward the reverse roller pair 123, and determines timing of the reversing the reverse roller pair 123 and the movement of the flapper 130. Note that the main conveyance encoder 149 (see FIG. 4) may be used to determine the timing.

The second conveyance path 112 joins a connection portion between the supply path 110 and the first conveyance path 111 (second junction 115), and can convey the print medium P guided to the second conveyance path 112 to the first conveyance path 111 again in a state where the front and back of the print medium P are reversed. An intermediate roller pair 124 is disposed in the second conveyance path 112 and is driven by the second conveyance motor 145 (see FIG. 4) similarly to the reverse roller pair 123. The intermediate roller pair 124 is provided to receive the print medium P from the reverse roller pair 123 and convey the print medium P to the main conveyance roller pair 121, and a plurality of the intermediate roller pairs 124 may be disposed according to a length of the print medium P.

Conveyance Control

The printing apparatus 100 according to the present embodiment has, as print modes, a single-sided print mode, a single double-sided print mode, and a double-sided retaining print mode. Here, the single-sided print mode is a print mode in which printing is performed only on the first side, and the single double-sided print mode is a print mode in which the double-sided printing is performed on one print medium P in which printing is performed only on the first side and on the second side which is the back side of the first side. The double-sided retaining print mode is a print mode executed in the case of printing of a plurality of sheets that prints two or more sheets including at least one sheet of single double-sided printing in one print command.

Conveyance control in the single-sided print mode will be described with reference to FIGS. 2A to 2C. Further, conveyance control in the double-sided retaining print mode will be described with reference to FIGS. 3A to 3E.

Figure 2A:
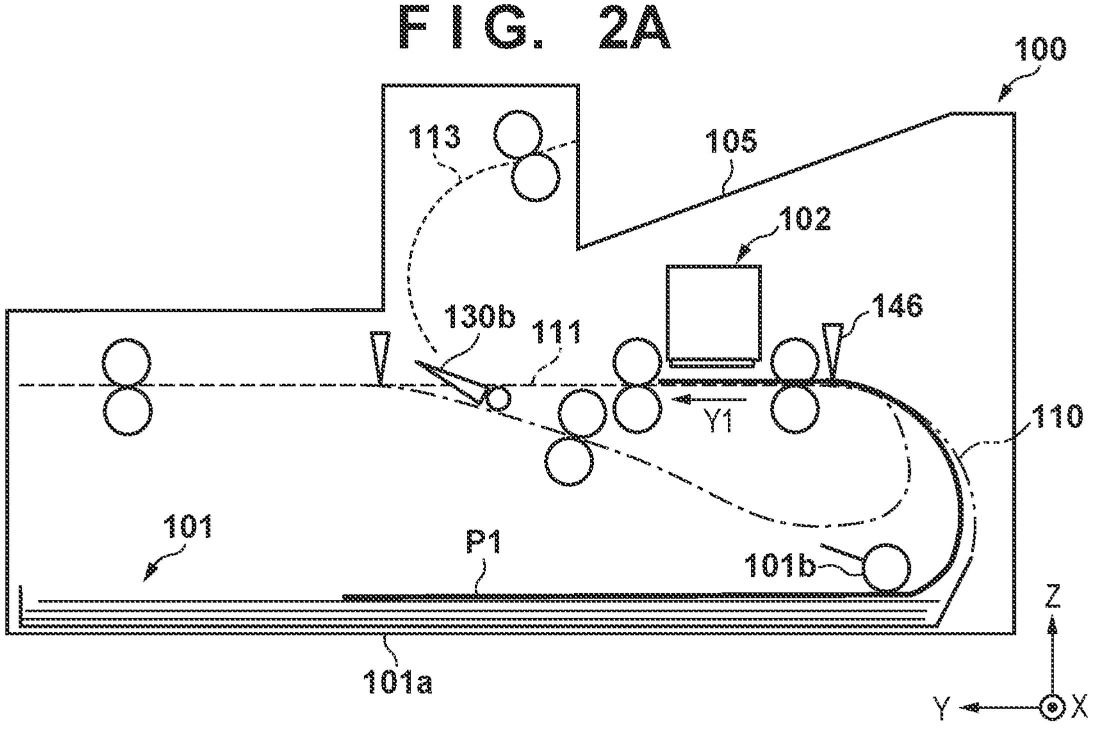
FIG. 2A is a schematic side sectional view illustrating behavior of a print medium during single-sided printing.
Figure 2B:
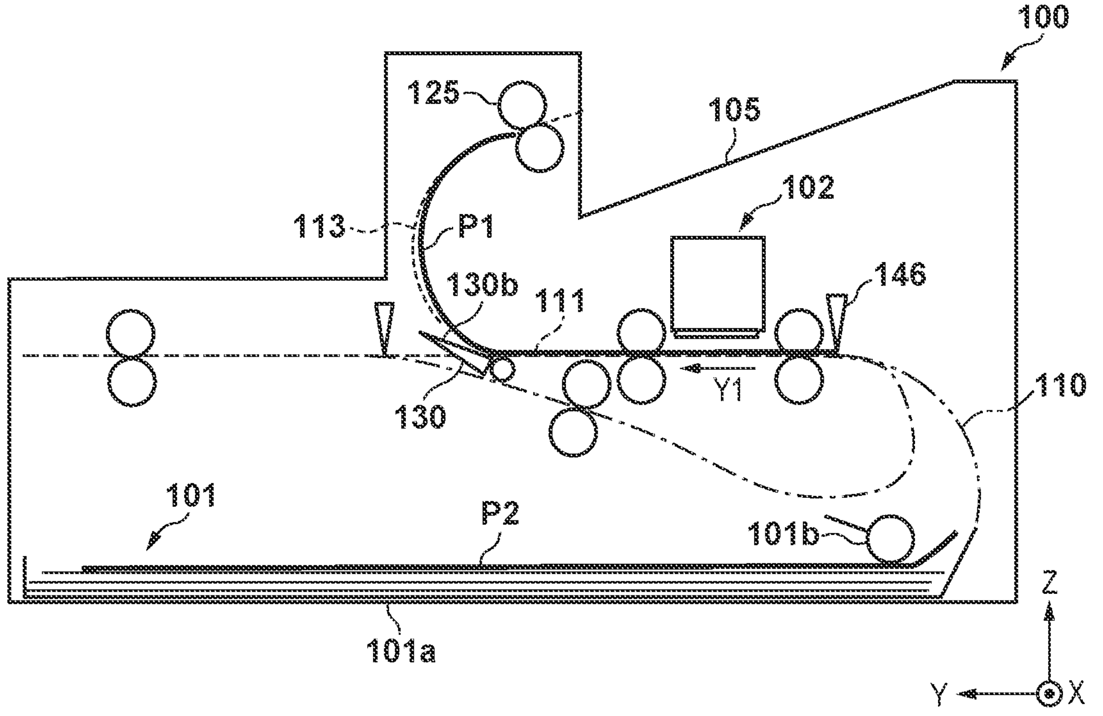
FIG. 2B is a schematic side sectional view illustrating behavior of the print medium during the single-sided printing.
Figure 2C:
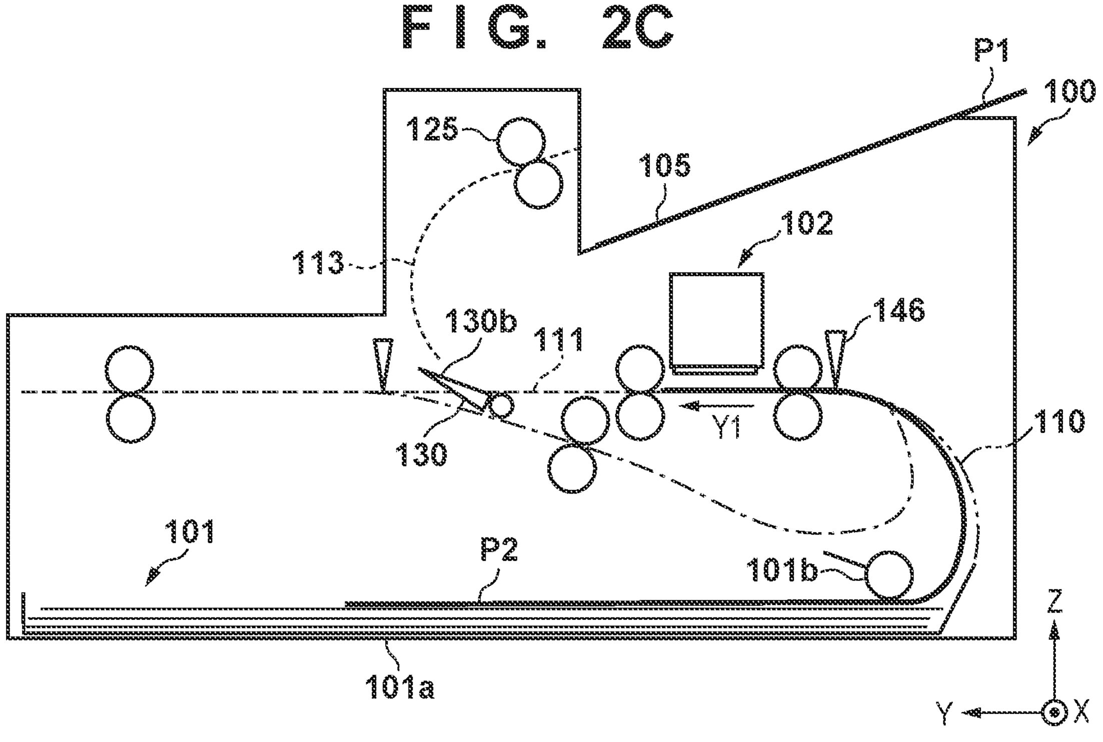
FIG. 2C is a schematic side sectional view illustrating behavior of the print medium during the single-sided printing.

FIGS. 2A to 2C are schematic side sectional views illustrating behavior of the print medium during the single-sided printing in the present embodiment. The behavior of the print medium in performing the single-sided printing on a plurality of sheets will be described in order with reference to FIGS. 2A to 2C. Here, a conveyance direction in the first conveyance path 111 during printing is referred to a first direction (Y1).

First, in FIG. 2A, when the printing apparatus 100 receives a print command, a first print medium P1 stacked on the sheet stacking unit 101 is fed by the feeding roller 101*b*, passes through the supply path 110, and is printed on the first side by the printing unit 102. At this time, the flapper 130 is located at the second position 130*b*.

Next, in FIG. 2B, the first print medium P1 passes through the flapper 130 and is conveyed to the sheet discharge path 113. Next, when it is detected that the trailing edge of the first print medium P1 in the first direction (Y1) has passed the position of the first sensor 146, a subsequent second print medium P2 is fed similarly to the first print medium P1.

Next, in FIG. 2C, the first print medium P1 on which printing is completed is conveyed by the sheet discharge roller 125 and stacked on the sheet discharge tray 105.

Printing is similarly performed on the second print medium P2, and then the second print medium P2 is discharged. This sequence of operations is repeated to perform the single-sided printing on the plurality of sheets.

FIGS. 3A to 3E are schematic side sectional views illustrating behavior of the print medium during the double-sided retaining printing in the present embodiment. The behavior of the print medium in the conveyance control performing the double-sided retaining printing will be described in order with reference to FIG. 3A to 3E.

Here, a conveyance direction from the first junction 114 toward the second junction 115 in the second conveyance path 112 is referred to as a second direction (Y2).

In the double-sided retaining printing, all conveyance of the print medium can be performed by intermittent drive (intermittent conveyance). However, here, a case in which control is performed by switching between the intermittent drive (intermittent conveyance) and continuous drive (continuous conveyance) will be described.

Figure 3A:
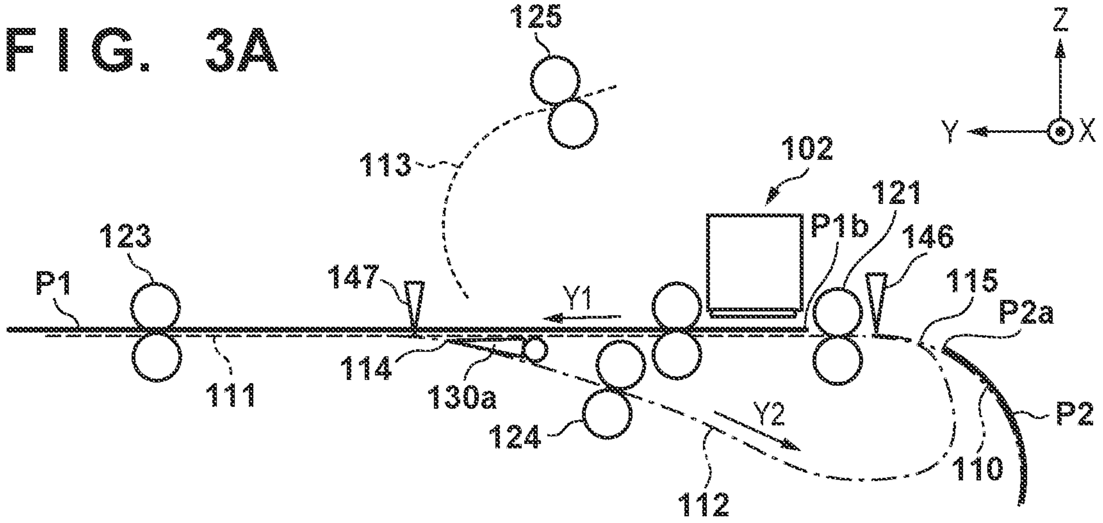
FIG. 3A is a schematic side sectional view illustrating behavior of the print medium during double-sided retaining printing.

First, in FIG. 3A, when the printing apparatus 100 receives a print command, as in the case of the single-sided printing, the first print medium P1 is fed by the feeding roller 101*b*, passes through the supply path 110, and is printed on the first side by the printing unit 102. At this time, for the double-sided printing, the flapper 130 is located at the first position 130*a*, and the first print medium P1 is conveyed along the first conveyance path 111 toward the reverse roller pair 123. The reverse roller pair 123 rotates making the first print medium P1 being directed toward the first direction (Y1), and is driven in synchronization with the main conveyance roller pair 121 and the sub conveyance roller pair 122 not to disturb the printing and conveyance of the first print medium P1. When it is detected that a trailing edge P1*b* of the first print medium P1 in the first direction (Y1) has passed through the first sensor 146, the first print medium P1 is conveyed by a predetermined amount, and then sheet feed of the subsequent second print medium P2 is started.

During printing on the first print medium P1, the main conveyance roller pair 121, the sub conveyance roller pair 122, and the reverse roller pair 123 are intermittently driven, but after printing is completed, these roller pairs are continuously driven.

Figure 3B:
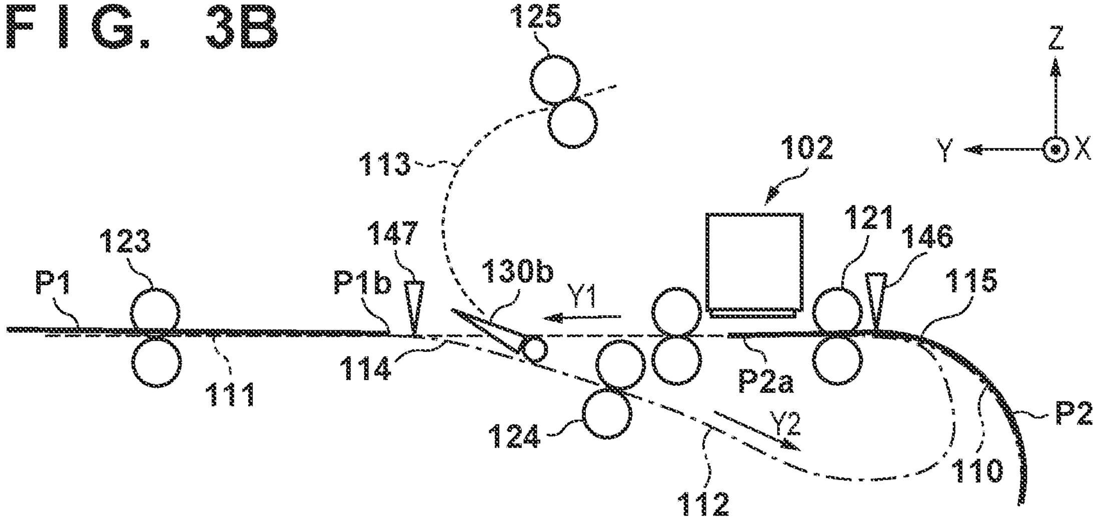
FIG. 3B is a schematic side sectional view illustrating behavior of the print medium during the double-sided retaining printing.

Next, in FIG. 3B, after the printing on the first print medium P1 is completed, the printing on the first side of the second print medium P2 is started by the printing unit 102. Further, the first print medium P1 is conveyed until the trailing edge P1*b* of the first print medium P1 in the first direction (Y1) passes through the flapper 130, and the flapper 130 moves from the first position 130*a* to the second position 130*b*.

In this operation, the main conveyance roller pair 121 and the sub conveyance roller pair 122 conveying the second print medium P2 are intermittently driven, but the reverse roller pair 123 and the intermediate roller pair 124 are continuously driven.

Figure 3C:
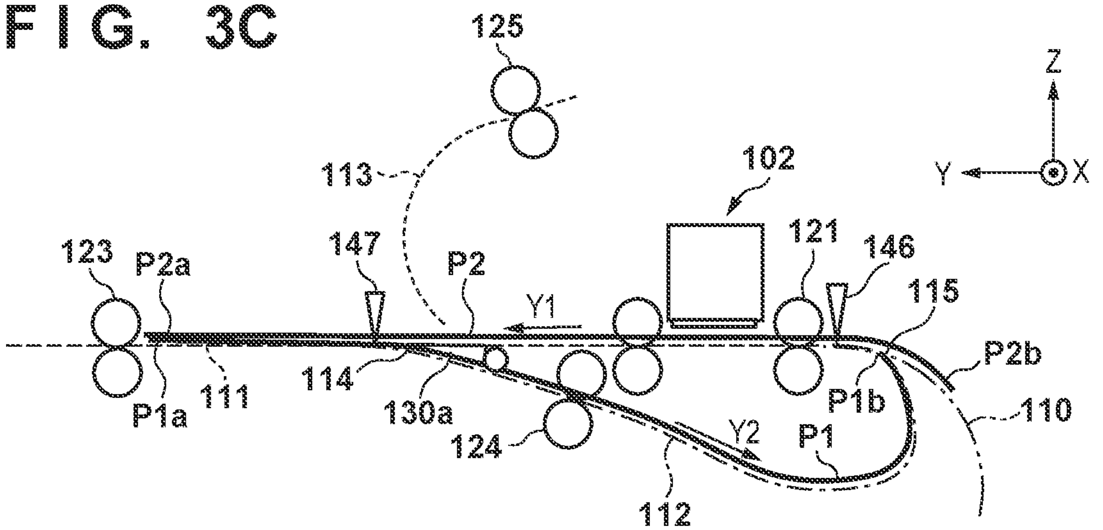
FIG. 3C is a schematic side sectional view illustrating behavior of the print medium during the double-sided retaining printing.

Next, in FIG. 3C, the rotation direction of the reverse roller pair 123 is reversed, and thus the conveyance direction of the first print medium P1 is changed and the first print medium P1 is conveyed into the second conveyance path 112. After a leading edge P1*b* of the first print medium in the second direction (Y2) passes through the flapper 130, the flapper 130 is moved to the first position 130*a*. Thus, the second print medium P2 can be conveyed to the downstream side of the first conveyance path 111 in the first direction (Y1) via the flapper 130.

The pull-in operation of the first print medium P1 into the second conveyance path 112 is performed such that when the leading edge P1*b* of the first print medium P1 conveyed in the second direction is detected by the second sensor 147, the first print medium P1 is conveyed by a predetermined amount and stopped. As the first print medium P1 is conveyed by the predetermined amount and stopped, the first print medium P1 is in a state of being retained in the second conveyance path 112 as illustrated in FIG. 3C.

Since the state in FIG. 3C is a state in which the first print medium P1 has reached the retaining position, the intermediate roller 124 is stopped, but is continuously driven until immediately before the stop.

When the first print medium P1 is pulled in to the second conveyance path 112, the main conveyance roller pair 121 and the sub conveyance roller pair 122 are conveying the second print medium, thus these roller pairs are intermittently driven. The reverse roller pair 123 is continuously driven in reverse rotation in order to perform an operation of feeding the first print medium P1 into the second conveyance path 112, and is intermittently driven in forward rotation after the first print medium P1 passes through the reverse roller pair 123.

The first print medium P1 is conveyed in the second conveyance path 112 toward the second junction 115 via the intermediate roller pair 124. In this case, a length of the conveyance path passing through the second conveyance path 112 from a nip position of the reverse roller pair 123 to the second junction 115 is set to be longer than the maximum sheet length in which the double-sided printing can be performed. That is, a relationship of d>Lmax is satisfied, where the conveyance path length is d and the maximum sheet length is Lmax.

For example, the maximum sheet length Lmax is the A4 size. That is, when the leading edge P1*b* of the first print medium in the second direction (Y2) reaches the second junction 115, the trailing edge P1*a* of the first print medium has passed through the nip position of the reverse roller pair 123. Further, a reverse timing of the reverse roller pair 123 and the conveying speeds of the reverse roller pair 123 and the intermediate roller pair 124 are controlled such that the trailing edge P1*a* of the first print medium in the second direction (Y2) passes through the nip position of the reverse roller pair 123 before the leading edge P2*a* of the second print medium in the first direction (Y1) reaches the nip position of the reverse roller pair 123. Thus, the second print medium P2 can be nipped by the reverse roller pair 123 without disturbing printing and conveyance of the second print medium P2. That is, productivity in the case of the double-sided printing of a plurality of sheets can be improved.

The conveyance path length from the reverse roller pair 123 to the intermediate roller pair 124 is set to be equal to or less than the minimum sheet length in which the double-sided printing can be performed. For example, a relationship of d≤Lmin is satisfied, where the conveyance path length is d and the minimum sheet length is Lmin. For example, the minimum sheet length Lmin is the A5 size. With this setting of the conveyance path length, the double-sided conveyance can be performed even with the minimum sheet length Lmin. In a case where the minimum sheet length is equal to or less than ½ of the maximum sheet length, a plurality of the intermediate roller pairs 124 are installed (a plurality of the intermediate roller pairs are provided).

Figure 3D:
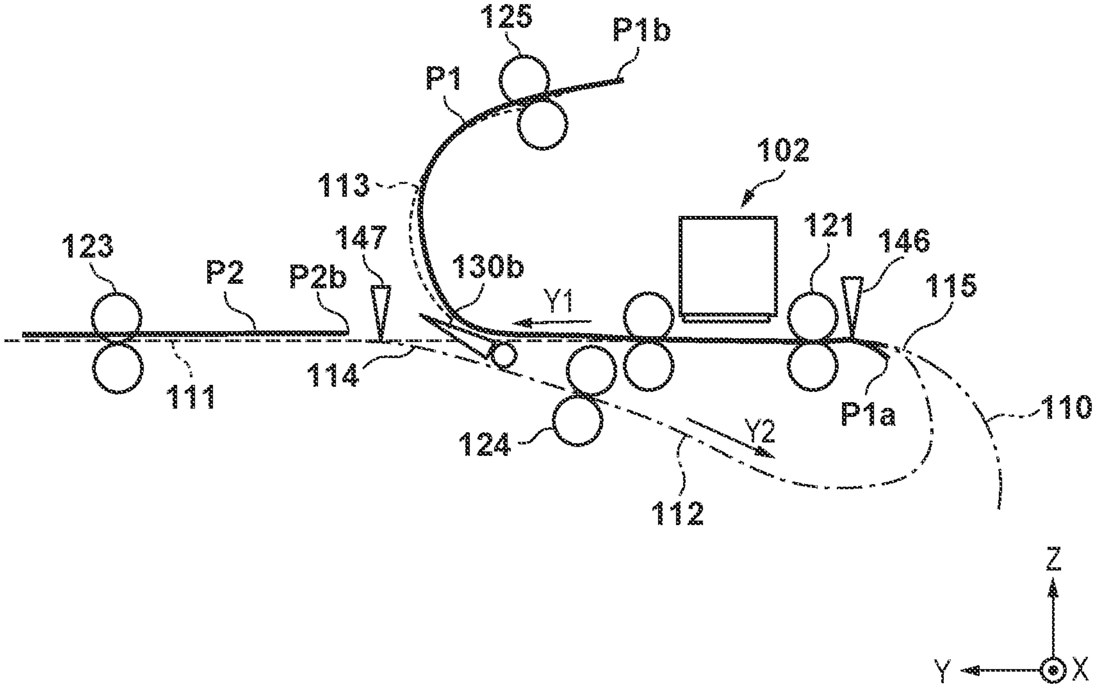
FIG. 3D is a schematic side sectional view illustrating behavior of the print medium during the double-sided retaining printing.

Next, in FIG. 3D, the first print medium P1 is conveyed to the first conveyance path 111 again, and the second side is printed by the printing unit 102. At this time, the conveyance speed and reverse timing of the reverse roller pair 123 are controlled such that the trailing edge P2*b* of the second print medium in the first direction (Y1) passes through the flapper 130 and is reversed by the reverse roller pair 123 before the leading edge P1*b* of the first print medium in the first direction (Y1) reaches the flapper 130. Thus, the first print medium P1 can be guided to the sheet discharge path 113 without disturbing the printing on the second side and conveyance of the first print medium P1 and the second print medium P2 can be guided to the second conveyance path 112. Thereafter, the first print medium P1 is discharged onto the sheet discharge tray 105 (see FIG. 1) via the sheet discharge roller pair 125, and at the same time, the second print medium P2 is conveyed through the second conveyance path 112 in the second direction (Y2) toward the second junction 115.

At this time, the main conveyance roller pair 121 and the sub conveyance roller pair 122 are intermittently driven to convey the first print medium P1 while printing the second side of the first print medium P1. The intermediate roller pair 124 is intermittently driven until the trailing edge P1*a* of the first print medium P1 passes through the intermediate roller pair 124, and is continuously driven after the trailing edge P1*a* passes through the intermediate roller pair 124.

The reverse roller pair 123 is intermittently driven in the forward direction from the state illustrated in FIG. 3C until the printing on the first side of the second print medium P2 is completed, and is continuously driven in the forward direction after the printing is completed. Further, the reverse roller pair 123 is continuously driven in the reverse direction when the pull-in operation of the second print medium P2 into the second conveyance path 112 is started.

Figure 3E:
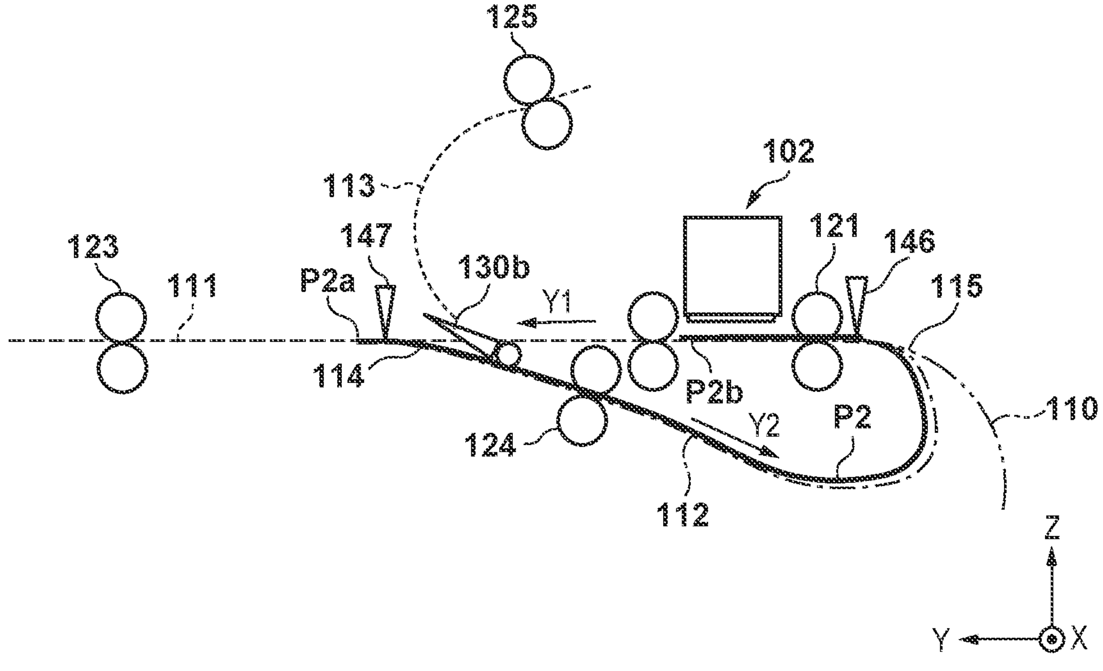
FIG. 3E is a schematic side sectional view illustrating behavior of the print medium during the double-sided retaining printing.

Next, in FIG. 3E, the second print medium P2 is printed on the second side, passes through the sheet discharge path 113, and is discharged onto the sheet discharge tray 105 (see FIG. 1). In a case where there is a subsequent print command, the operation is repeated according to a print mode of the subsequent print command.

At this time, the main conveyance roller pair 121, the sub conveyance roller pair 122, and the intermediate roller pair 124 are intermittently driven until the printing on the second side of the second print medium P2 is completed, and are continuously driven after the printing is completed.

Switching of driving of the intermediate roller pair 124 between driving according to the preceding sheet (the print medium being printed) and driving according to the succeeding sheet (the print medium being pulled in) is managed based on whether the intermediate roller pair 124 is driven by a predetermined amount after the second sensor 147 detects the trailing edge of the preceding sheet.

For example, when the first print medium P1 is re-conveyed in the second direction from the state in FIG. 3B, the intermediate roller pair 124 is driven initially according to the first print medium P1. Then, when the trailing edge P1*a* of the first print medium P1 is detected by the second sensor 147 and then conveyed by the predetermined amount (passes through the intermediate roller pair 124), the driving is switched to driving according to the second print medium P2 (succeeding sheet).

Control Unit

A configuration of a control unit of the printing apparatus 100 will be described with reference to FIG. 4. FIG. 4 is a block diagram illustrating the configuration of a control unit 140 that controls the printing apparatus 100.

The control unit 140 of the printing apparatus 100 receives a print command from a host apparatus such as a personal computer (PC) and performs an operation according to the command. A determination unit 142 of a driver 141 determines an execution command based on signals from the first sensor 146, the second sensor 147, the carriage encoder 148, the main conveyance encoder 149, and the like provided in the printing apparatus 100. The driver 141 drives the printing head 102*b*, the carriage motor 143, the first conveyance motor 144, and the second conveyance motor 145. The main conveyance roller pair 121, the sub conveyance roller pair 122, and the sheet discharge roller pair 125 are driven by the first conveyance motor 144 via a first drive transmission mechanism 151*a*. The feeding roller 101*b* can be driven by adding driving of the carriage motor 143. The reverse roller pair 123, the intermediate roller pair 124, and the flapper 130 are driven by the second conveyance motor 145 via a second drive transmission mechanism 151*b*.

Overall Sequence

Figure 5:
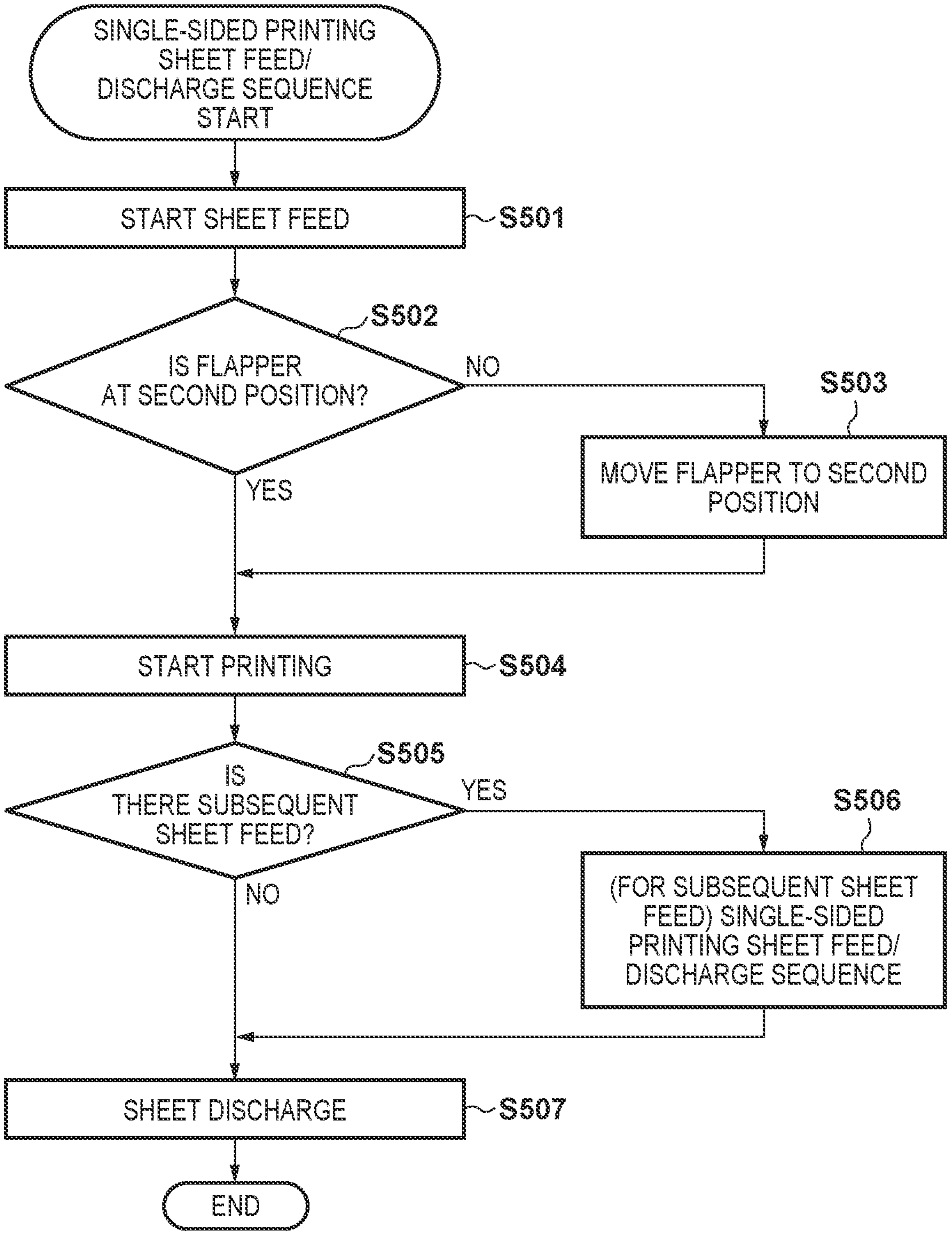
FIG. 5 is a flowchart illustrating a sequence during the single-sided printing.
Figure 6:
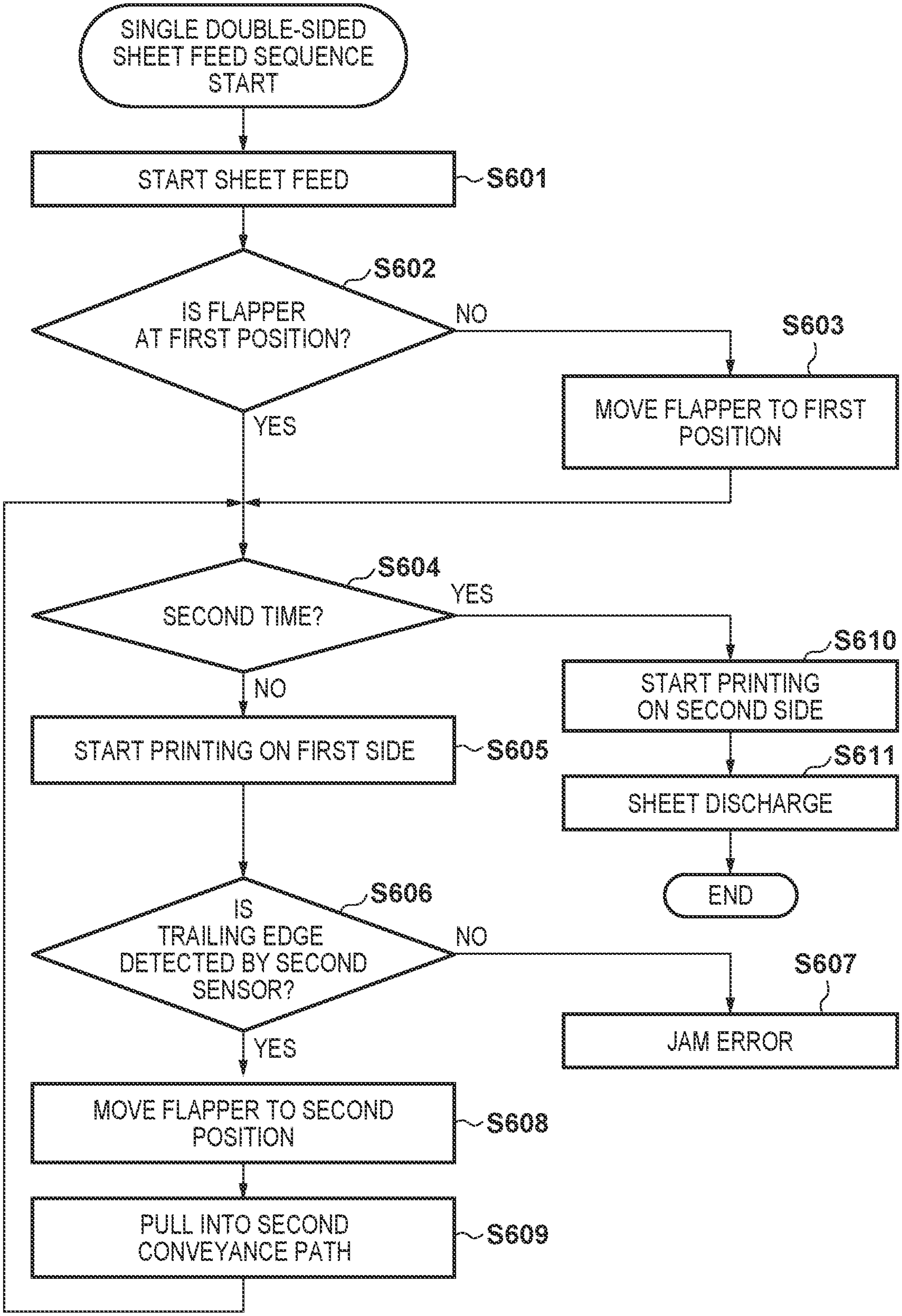
FIG. 6 is a flowchart illustrating a sequence during single double-sided printing.

Hereinafter, operation sequences in the single-sided printing, the single double-sided printing, and the double-sided retaining printing will be described with reference to FIGS. 5 to 7.

Single-Sided Printing Sheet Feed/Discharge Sequence

A sheet feed/discharge sequence in the single-sided printing will be described with reference to FIG. 5.

First, in step S501, the printing apparatus 100 that has received a print command for the single-sided printing starts sheet feed.

Next, in step S502, it is checked whether the flapper 130 is located at the second position 130*b*. If the flapper 130 is not located at the second position 130*b*, then, in step S503, the flapper 130 is moved to the second position 130*b*. Thereafter, in step S504, printing is started.

Next, in step S505, it is determined whether there is a subsequent sheet feed. If there is a subsequent sheet feed, then, in step S506, the single-sided printing sheet feed/discharge sequence for the subsequent sheet feed is executed without waiting for sheet discharge of the print medium P. Finally, in step S507, the sheet discharge is performed.

Single Double-Sided Sheet Feed/Discharge Sequence

A sheet feed/discharge sequence in the single double-sided printing will be described with reference to FIG. 6.

First, in step S601, the printing apparatus 100 that has received a print command for the single double-sided printing starts sheet feed.

Next, in step S602, it is checked whether the flapper 130 is located at the first position 130*a*. If the flapper 130 is not located at the first position 130*a*, then, in step S603, the flapper 130 is moved to the first position 130*a*.

Next, in step S604, it is determined whether the printing is to be executed for the second time. If it is the first time, then the process proceeds to step S605. In step S605, printing on the first side is started.

In step S606, the second sensor 147 performs detection of the trailing edge of the print medium P. If the trailing edge is not detected, then, in step S607, it is determined that sheet jam has occurred. If the trailing edge is detected, then it is determined that the trailing edge of the print medium P has reliably passed through the flapper 130, and in step S608, the flapper 130 is moved to the second position 130*b*.

Next, in step S609, the print medium P is pulled in to the second conveyance path 112 by rotating the reverse roller pair 123 in the reverse direction.

On the other hand, in step S604, if it is determined that the printing is to be executed for the second time, then the process proceeds to step S610. Then, in step S610, printing on the second side of the print medium P in which printing on the first side is completed is started. Finally, in step S611, the sheet discharge is performed.

Double-Sided Retaining Printing Sheet Feed/Discharge Sequence

Figure 7A:
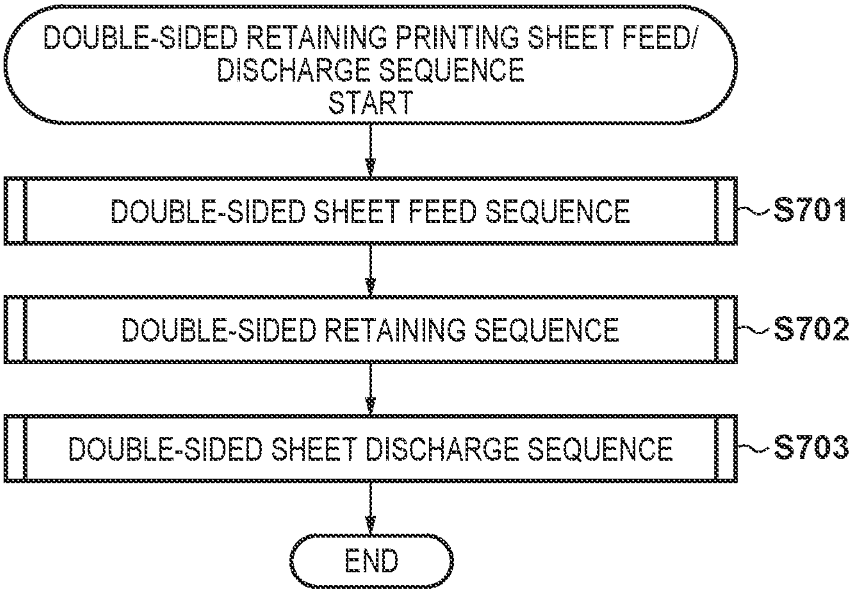
FIG. 7A is a flowchart illustrating a sequence during the double-sided retaining printing.

A sheet feed/discharge sequence in the double-sided retaining printing will be described with reference to FIGS. 7A to 7D. FIG. 7A is a flow chart of the overall operation of the double-sided retaining printing sheet feed/discharge sequence.

The printing apparatus 100 that has received the print command for the double-sided retaining printing proceeds to the double-sided sheet feed sequence in step S701. The double-sided sheet feed sequence will be described later with reference to FIG. 7B. After the execution in step S701 is completed, the process proceeds to the double-sided retaining sequence in step S702. The double-sided retaining sequence will be described later with reference to FIG. 7C. Then, after the execution in step S702 is completed, the process proceeds to the double-sided sheet discharge sequence in step S703. The double-sided sheet discharge sequence will be described later with reference to FIG. 7D.

In the following, each sequence will be described.

Figure 7B:
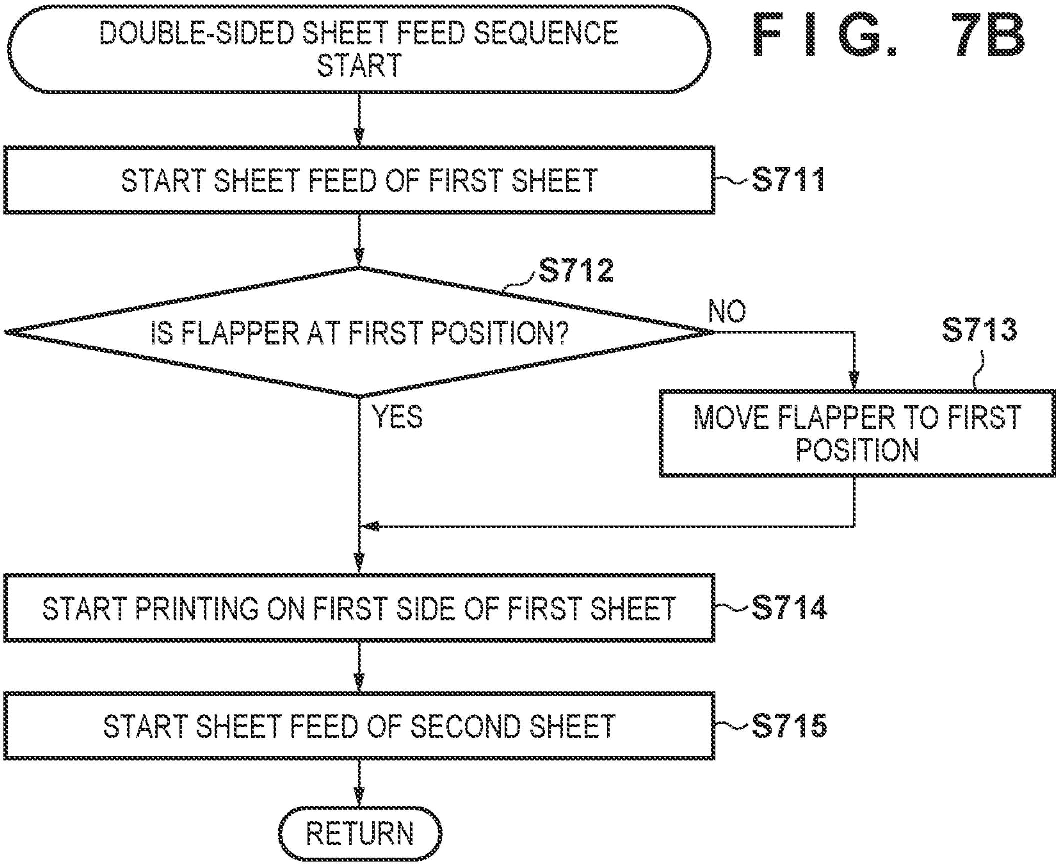
FIG. 7B is a flowchart illustrating a sequence during the double-sided retaining printing.

In the double-sided sheet feed sequence in FIG. 7B, first, in step S711, sheet feed of the print medium P1 of a first sheet is started.

Next, in step S712, it is checked whether the flapper 130 is located at the first position 130*a*. If the flapper 130 is not located at the first position 130*a*, then in step S713, the flapper 130 is moved to the first position 130*a*.

After that, in step S714, printing on the first side of the print medium P1 of the first sheet is started. In step S715, sheet feed of the print medium P2 of a second sheet is started. Step S715 is started at a timing after the trailing edge P1*b* of the print medium P1 of the first sheet has passed through the first sensor 146 and has been conveyed by a predetermined amount. When the operation in FIG. 7B is completed, the process proceeds to the double-sided retaining sequence in FIG. 7C.

Figure 7C:
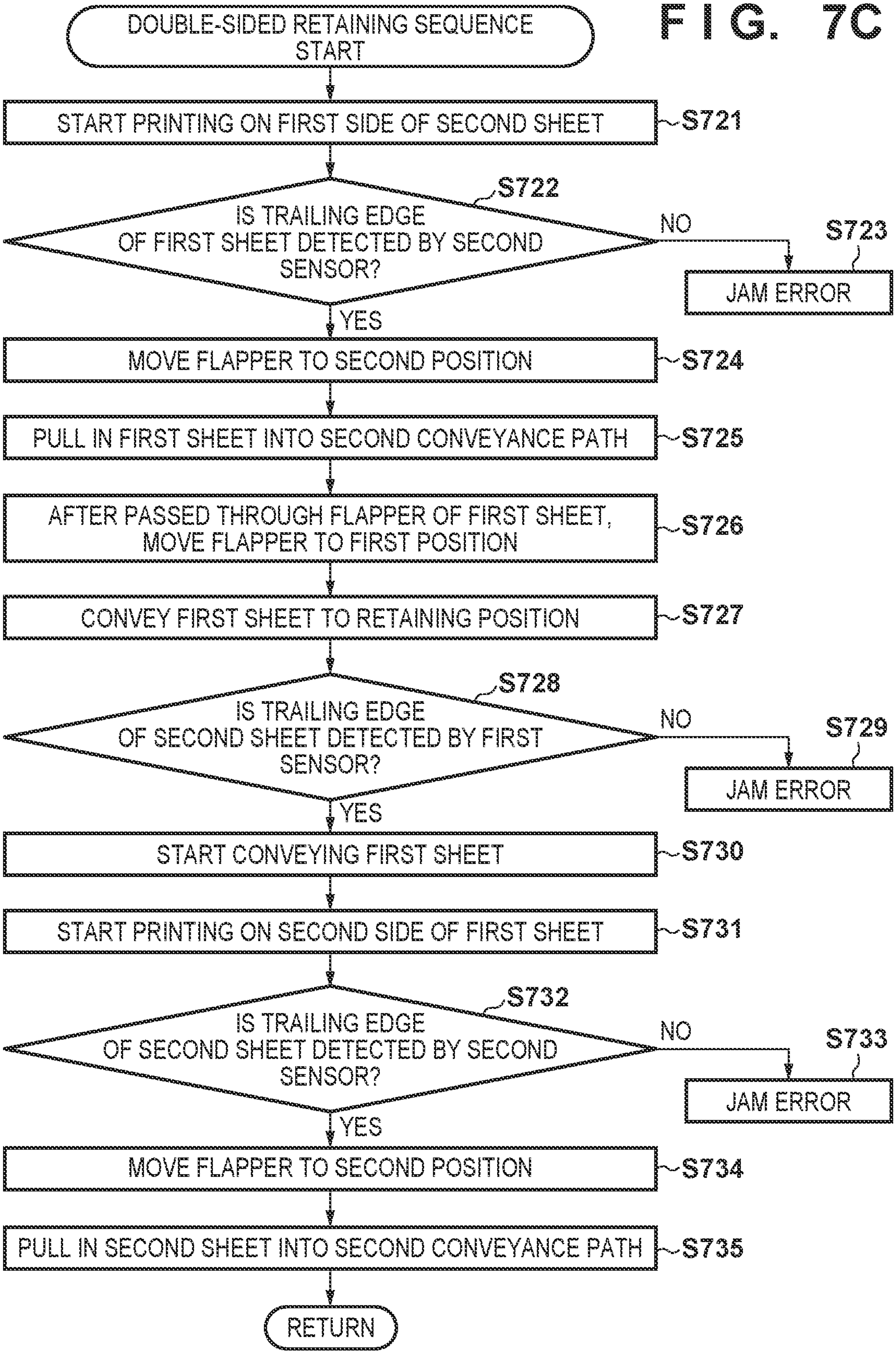
FIG. 7C is a flowchart illustrating a sequence during the double-sided retaining printing.

In the double-sided retaining sequence in FIG. 7C, first, in step S721, printing on the first side of the print medium P2 of a second sheet is started.

Next, in step S722, it is checked that the trailing edge P1*b* of the print medium P1 of the first sheet has passed through the second sensor 147. If the passage is confirmed, then in step S724, the flapper 130 is moved to the second position 130*b*. In step S722, if the detection of the trailing edge P1*b* of the print medium P1 of the first sheet is not confirmed, then in step S723, it is determined that a sheet jam error has occurred.

Here, in step S724, by moving the flapper 130 to the second position 130*b*, the print medium P1 of the first sheet can be pulled in to the second conveyance path 112. At this time, the printing process is being executed on the print medium P2 of the second sheet, and the following control is performed not to disturb the printing of the second sheet. An elapsed time from the start of printing on the print medium P2 of the second sheet until the leading edge P2*a* of the print medium P2 of the second sheet passes through the flapper 130 is referred to as T2. At this time, the conveyance speed of the reverse roller pair 123 for conveying the print medium P1 of the first sheet is changed such that an elapsed time T1 from the start of printing on the print medium P2 of the second sheet until the trailing edge P1*b* of the print medium P1 of the first sheet passes through the flapper 130 is less than T2. However, in the case of T1≥T2 being satisfied, a waiting time is provided before printing on the print medium P2 of the second sheet so that T1<T2 is satisfied at the shortest T1.

Next, in step S725, the reverse roller pair 123 is rotated in the reverse direction to pull in the print medium P1 of the first sheet into the second conveyance path 112.

Next, in step S726, after the leading edge P1*b* of the print medium P1 of the first sheet in the pull-in direction (second direction Y2) into the second conveyance path 112 passes through the flapper 130, the flapper 130 is moved to the first position 130*a*.

Next, in step S727, the print medium P1 of the first sheet is conveyed to be entirely accommodated in the second conveyance path 112. At this time, the leading edge P2*a* of the print medium P2 of the second sheet is conveyed from the flapper 130 toward the reverse roller pair 123, but the following control is performed not to disturb the printing and conveyance of the print medium P2 of the second sheet. An elapsed time from when the leading edge P2*a* of the print medium P2 of the second sheet passes through the flapper 130 until the leading edge P2*a* of the print medium P2 of the second sheet reaches the reverse roller pair 123 is referred to as T2_2. At this time, the conveyance speeds of the reverse roller pair 123 and the intermediate roller pair 124 and the reverse rotation timing of the reverse roller pair 123 are changed such that an elapsed time T1_2 from when the leading edge P2*a* of the print medium P2 of the second sheet passes through the flapper 130 to when the trailing edge Pla of the print medium P1 of the first sheet in the pull-in direction (second direction Y2) into the second conveyance path 112 passes through the reverse roller pair 123 is less than T2_2. However, in the case of T1_2≥T2_2 being satisfied, a waiting time is provided before printing or conveyance of the print medium P2 of the second sheet such that T1_2<T2_2 is satisfied at the shortest T1_2.

Next, in step S728, it is determined whether the first sensor 146 has detected the trailing edge P2*b* of the print medium P2 of the second sheet. In a case where the trailing edge P2*b* of the print medium P2 of the second sheet has been detected, then, in step S730, conveyance of the print medium P1 of the first sheet from the second conveyance path 112 to the first conveyance path 11 is started. Then in step S731, printing on the second side of the print medium P1 of the first sheet is started.

Next, regarding step S732 to step S735, the processing is similar to step S722 to step S725; however, the first sheet and the second sheet are switched and the conveyance speed of the reverse roller pair 123 is changed to satisfy that T1 is less than T2. That is, at this time, T2 is an elapsed time from the start of printing on the second side of the print medium P1 of the first sheet until the leading edge P1*b* of the print medium P1 of the first sheet passes through the flapper 130. T1 is an elapsed time from the start of printing on the second side of the print medium P1 of the first sheet until the trailing edge P2*b* of the print medium P2 of the second sheet passes through the flapper 130. The same applies to the case of T1≥T2 being satisfied.

In step S732, if the trailing edge P2*b* of the print medium P2 of the second sheet is not detected, then, in step S733, it is determined that the sheet jam error has occurred.

Figure 7D:
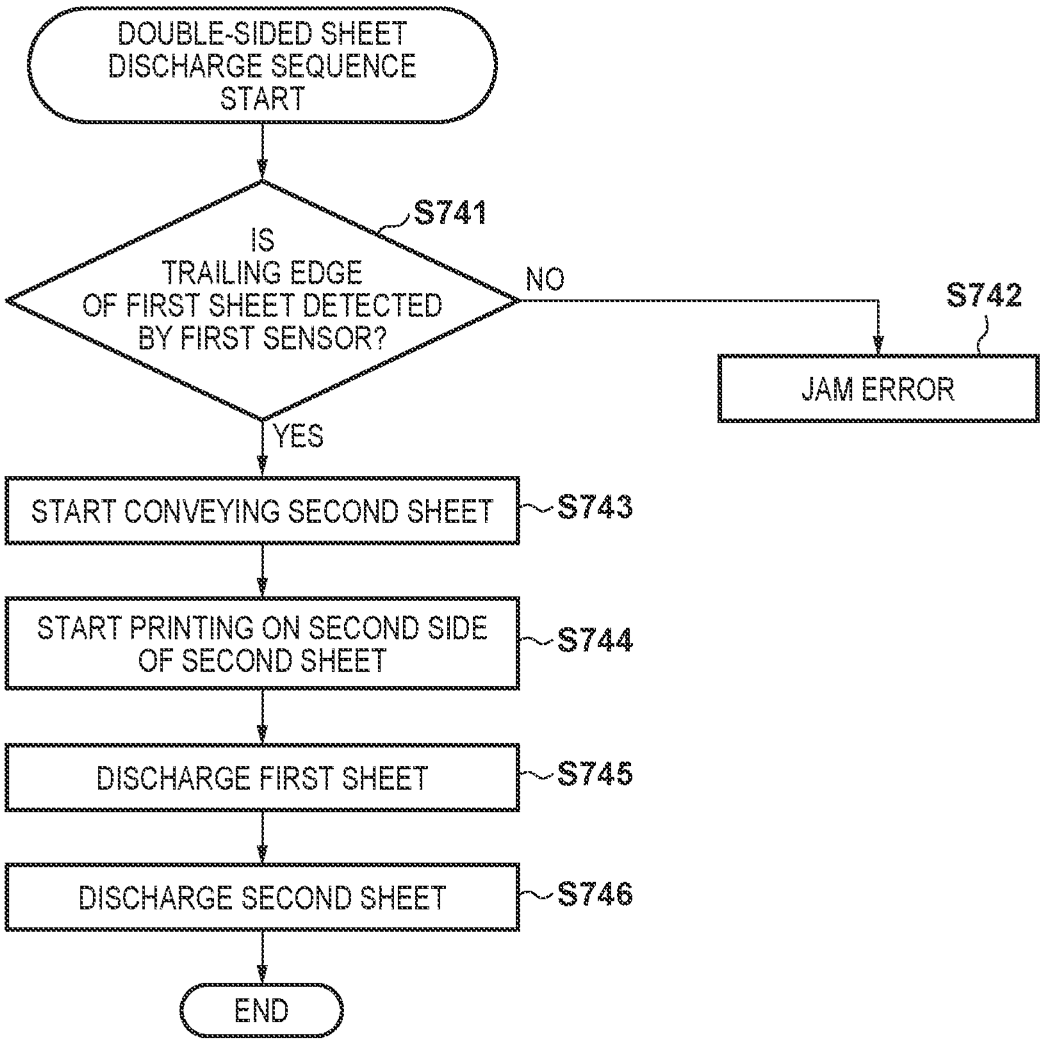
FIG. 7D is a flowchart illustrating a sequence during the double-sided retaining printing.

When the processing in step S735 is completed, the sequence proceeds to the double-sided sheet discharge sequence in FIG. 7D.

In the double-sided sheet discharge sequence in FIG. 7D, first, in step S741, it is determined whether the first sensor 146 has detected the trailing edge P1*a* of the print medium P1 of the first sheet. If the trailing edge P1*a* of the print medium P1 of the first sheet is detected, then in step S743, conveyance of the print medium P2 of the second sheet retaining in the second conveyance path 112 to the first conveyance path 111 is started.

Next, in step S744, printing on the second side of the print medium P2 of the second sheet is started.

On the other hand, in step S741, if the detection of the trailing edge P1*a* of the print medium P1 of the first sheet is not confirmed, then, in step S742, it is determined that the sheet jam error has occurred.

Next, in step S745, since the flapper 130 is located at the second position 130*b*, the print medium P1 of the first sheet passes through the sheet discharge path 113 (see FIG. 1) and is discharged onto the sheet discharge tray 105 (see FIG. 1).

Next, in step S746, the print medium P2 of the second sheet is discharged similarly to step S745.

As described above, according to the above-described embodiments, in the case where the first print medium on which printing is performed first is reversed by the reverse roller and is conveyed in the second direction in the second conveyance path, rotation speeds of the conveyance roller and the reverse roller and the reverse timing are controlled such that the timing at which the trailing edge of the first print medium in the second direction passes through the reverse roller is earlier than the timing at which the second print medium on which printing is to be subsequently performed is conveyed by the conveyance roller and the leading edge of the second print medium reaches the reverse roller. With this control, it is not necessary to stop the printing and conveyance of the second print medium and wait until the trailing edge of the first print medium passes through the reverse roller, and the time required for the printing process in performing the double-sided printing can be shortened.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-072669, filed Apr. 26, 2022, which is hereby incorporated by reference herein in its entirety.

What is claimed is:

1. A printing apparatus comprising:

a first conveyance path configured to convey a print medium in a first direction;

a conveyance roller provided in the first conveyance path and configured to convey the print medium in the first direction;

a printing head configured to print an image on the print medium conveyed by the conveyance roller;

a carriage configured to mount the printing head and to move in a width direction crossing the first direction;

a reverse roller provided at a position downstream of the printing head with respect to the first direction of the first conveyance path and configured to be able to reverse a conveyance direction of the print medium and convey the print medium in a second direction different from the first direction;

a second conveyance path configured to connect with the first conveyance path at a position downstream of the printing head in the first conveyance direction and reverse the front and back of the print medium conveyed in the second direction by the reverse roller by conveying the print medium to a location upstream of the printing head with respect to the first conveyance direction;

an intermediate roller provided in the second conveyance path; and a control unit configured to control conveyance of a first print medium and a second print medium which is subsequent to the first print medium by the conveyance roller and the reverse roller, wherein a conveyance path length passing through the second conveyance path from the reverse roller to the intermediate roller is shorter than a length of a minimum print medium on which double-sided printing can be performed by the printing apparatus, wherein in a case in which the first print medium on which printing has been performed first is conveyed in the second direction via the second conveyance path, the control unit controls the conveyance roller and the reverse roller such that a trailing edge of the first print medium with respect to the second direction passes through the reverse roller driven continuously before the second print medium conveyed by the conveyance roller driven intermittently during printing by the printing head reaches the reverse roller, and wherein in a case in which the first print medium from the second conveyance path is printed by the printing head, the intermediate roller is intermittently driven, and when a trailing edge of the first print medium with respect to the second direction passes through the intermediate roller, the intermediate roller is continuously driven.

2. The printing apparatus according to claim 1, wherein a conveyance path length passing through the second conveyance path from the reverse roller to the position at which the second conveyance path joins the first conveyance path is longer than a length of a maximum print medium on which double-sided printing can be performed by the printing apparatus.

3. The printing apparatus according to claim 1, wherein the intermediate roller is driven by the same driving source as a driving source of the reverse roller.

4. The printing apparatus according to claim 1, wherein a plurality of the intermediate rollers are provided, and a length of a minimum print medium on which double-sided printing can be performed by the printing apparatus is equal to or less than ½ of a length of a maximum print medium on which the double-sided printing can be performed.

5. The printing apparatus according to claim 1, further comprising a flapper configured to switch between a first position at which the print medium is guided to a downstream side of the first conveyance path in the first direction and a second position at which the print medium is guided to a downstream side of the second conveyance path in the second direction.

6. The printing apparatus according to claim 1, further comprising a sheet discharge path configured to convey the print medium on which printing is completed to a path different from the first conveyance path.

7. The printing apparatus according to claim 1, wherein the reverse roller rotates to convey the print medium on which printing is performed in the first direction before reversing the print medium.

8. The printing apparatus according to claim 1, further comprising a sensor disposed at a position on an upstream side of the conveyance roller with respect to the first direction in the first conveyance path and configured to detect an edge portion of the print medium.

9. The printing apparatus according to claim 1, further comprising a sensor disposed at a position on a downstream side of the conveyance roller in the first direction in the first conveyance path and configured to detect an edge portion of the print medium.

10. A method of controlling a printing apparatus including a first conveyance path configured to convey a print medium in a first direction, a conveyance roller provided in the first conveyance path and configured to convey the print medium in the first direction, a printing head configured to print an image on the print medium conveyed by the conveyance roller, a carriage configured to mount the printing head and to move in a width direction crossing the first direction, a reverse roller provided at a position downstream of the printing head with respect to the first direction of the first conveyance path and configured to be able to reverse a conveyance direction of the print medium and convey the print medium in a second direction different from the first direction, a second conveyance path configured to connect the first conveyance path at a position downstream of the printing head in the first conveyance direction and reverse the front and back of the print medium conveyed in the second direction by the reverse roller by conveying the print medium to a location upstream of the printing head with respect to the first conveyance direction, and an intermediate roller provided in the second conveyance path, the method comprising:

controlling conveyance of a first print medium and a second print medium which is subsequent to the first print medium by the conveyance roller and the reverse roller, wherein a conveyance path length passing through the second conveyance path from the reverse roller to the intermediate roller is shorter than a length of a minimum print medium on which double-sided printing can be performed by the printing apparatus, wherein in a case in which the first print medium on which printing has been performed first is conveyed in the second direction via the second conveyance path, the controlling controls the conveyance roller and the reverse roller such that a trailing edge of the first print medium with respect to the second direction passes through the reverse roller driven continuously before the second print medium conveyed by the conveyance roller driven intermittently during printing by the printing head reaches the reverse roller, and wherein in a case in which the first print medium from the second conveyance path is printed by the printing head, the intermediate roller is intermittently driven, and when a trailing edge of the first print medium with respect to the second direction passes through the intermediate roller, the intermediate roller is continuously driven.

11. A non-transitory computer-readable storage medium storing a program for causing a computer to execute a control method of a printing apparatus including a first conveyance path configured to convey a print medium in a first direction, a conveyance roller provided in the first conveyance path and configured to convey the print medium in the first direction, a printing head configured to print an image on the print medium conveyed by the conveyance roller, a carriage configured to mount the printing head and to move in a width direction crossing the first direction, a reverse roller provided at a position downstream of the printing head in the first direction of the first conveyance path and configured to be able to reverse a conveyance direction of the print medium and convey the print medium in a second direction different from the first direction, a second conveyance path configured to connect the first conveyance path at a position downstream of the printing head in the first conveyance direction and reverse the front and back of the print medium conveyed in the second direction by the reverse roller by conveying the print medium to a location upstream of the printing head with respect to the first conveyance direction, and an intermediate roller provided in the second conveyance path, the method comprising:

controlling conveyance of a first print medium and a second print medium which is subsequent to the first print medium by the conveyance roller and the reverse roller, wherein a conveyance path length passing through the second conveyance path from the reverse roller to the intermediate roller is shorter than a length of a minimum print medium on which double-sided printing can be performed by the printing apparatus, wherein in a case in which the first print medium on which printing has been performed first is conveyed in the second direction via the second conveyance path, the controlling controls the conveyance roller and the reverse roller such that a trailing edge of the first print medium with respect to the second direction passes through the reverse roller driven continuously before the second print medium conveyed by the conveyance roller driven intermittently during printing by the printing head reaches the reverse roller, and wherein in a case in which the first print medium from the second conveyance path is printed by the printing head, the intermediate roller is intermittently driven, and when a trailing edge of the first print medium with respect to the second direction passes through the intermediate roller, the intermediate roller is continuously driven.

* * * * *